US008610736B2

(12) United States Patent
Han

(10) Patent No.: US 8,610,736 B2
(45) Date of Patent: *Dec. 17, 2013

(54) SCREEN DISPLAY METHOD, INFORMATION PROCESSING APPARATUS, AND COMPUTER PROGRAM PRODUCT

(75) Inventor: Xiaofeng Han, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,863

(22) Filed: Jul. 13, 2012

(65) Prior Publication Data

US 2012/0274968 A1 Nov. 1, 2012

Related U.S. Application Data

(63) Continuation of application No. 12/399,563, filed on Mar. 6, 2009, now Pat. No. 8,248,427.

(30) Foreign Application Priority Data

Mar. 14, 2008 (JP) .................................. 2008-066007

(51) Int. Cl.
*G09G 5/00* (2006.01)
(52) U.S. Cl.
USPC .......................................... 345/581; 345/619
(58) Field of Classification Search
None
See application file for complete search history.

(56) References Cited

U.S. PATENT DOCUMENTS

| 7,523,222 | B2 |   | 4/2009  | Carlson et al. |        |
|-----------|-----|---|---------|----------------|--------|
| 7,986,418 | B2 | * | 7/2011  | Hoshino et al. | 358/1.13 |
| 8,248,427 | B2 | * | 8/2012  | Han            | 345/581 |
| 2006/0170984 | A1 | * | 8/2006  | Matsuda      | 358/462 |
| 2007/0214508 | A1 | * | 9/2007  | Fukui et al. | 726/28 |
| 2008/0294983 | A1 | * | 11/2008 | Hoshino et al. | 715/273 |

FOREIGN PATENT DOCUMENTS

| JP | 2002-152446 | 5/2002 |
|----|-------------|--------|
| JP | 2005-57549  | 3/2005 |
| JP | 2006-309726 | 9/2006 |

* cited by examiner

*Primary Examiner* — Kee M. Tung
*Assistant Examiner* — Leon T Cain, II
(74) *Attorney, Agent, or Firm* — Oblon, Spivak, McClelland, Maier & Neustadt, L.L.P.

(57) ABSTRACT

An image forming apparatus is connected to an information processing apparatus via a network. The image forming apparatus transmits setting information contained in a setting screen to the information processing apparatus and receives customized setting information generated by the information processing apparatus based on the setting information, whereby the setting screen is customized by the customized setting information.

19 Claims, 13 Drawing Sheets

| MASTER ITEM | SUB ITEM | SUB-SUB ITEM |
|---|---|---|
| SCAN SETTING | ScanResolution (RESOLUTION) | 100 |
| | | 200 |
| | | 300 |
| | ScanImageAds (AUTO IMAGE DENSITY) | ADS_RESET (AUTO IMAGE DENSITY OFF) |
| | | ADS_SET (AUTO IMAGE DENSITY ON) |
| | ScanOrientation | LEFT_FEED (NO ROTATE) |
| | | TOP_FEED (ROTATE 90) |

FIG.5

```
<xxxGroup id="xxxGroup" enabled="true" visible="true" required="true">
    <ParameterID>scanResolution</ParameterID>
    <Action id="onInit">
        <UIEvent/>
    </Action>
    <xxx id="100" enabled="true" visible="true" text="100dpi" selected="false">
        <Value>100</Value>
    </xxx>
    <xxx id="200" enabled="true" visible="true" text="200dpi" selected="false">
        <Value>200</Value>
    </xxx>
    <xxx id="300" enabled="true" visible="true" text="300dpi" selected="true">
        <Value>300</Value>
    </xxx>
    <xxx id="400" enabled="true" visible="true" text="400dpi" selected="false">
        <Value>100</Value>
    </xxx>
    <xxx id="600" enabled="true" visible="true" text="600dpi" selected="false">
        <Value>600</Value>
    </xxx>
</xxxGroup>
```

FIG.6

| ProjectID | ProfileID | PluginInstanceID |
|---|---|---|
| 00001-001A | 00001 | 001A-a |

```
<ProfileID>00001</ProfileID>
<ProjectID>00001-001A</ProjectID>
<Plugin id="sdip.plugin.output.toemail.ToSMTP" type="output"
displayName="SMTP" instanceId="001A-a">
</Plugin>
...
```
220

FIG.9

```
<xxxGroup id="xxxGroup" enabled="true" visible="true" required="true">
    <ParameterID>scanResolution</ParameterID>
    <Action id="onInit">
        <UIEvent/>
    </Action>
    <xxx id="100" enabled="true" visible="true" text="100dpi" selected="false">
        <Value>100</Value>
    </xxx>
    <xxx id="200" enabled="true" visible="true" text="200dpi" selected="false">
        <Value>200</Value>
    </xxx>
    <xxx id="300" enabled="true" visible="true" text="300dpi" selected="true">
        <Value>300</Value>
    </xxx>
    <xxx id="400" enabled="false" visible="false" text="400dpi" selected="false">
        <Value>100</Value>
    </xxx>
    <xxx id="600" enabled="false" visible="false" text="600dpi" selected="false">
        <Value>600</Value>
    </xxx>
</xxxGroup>
```

FIG.10

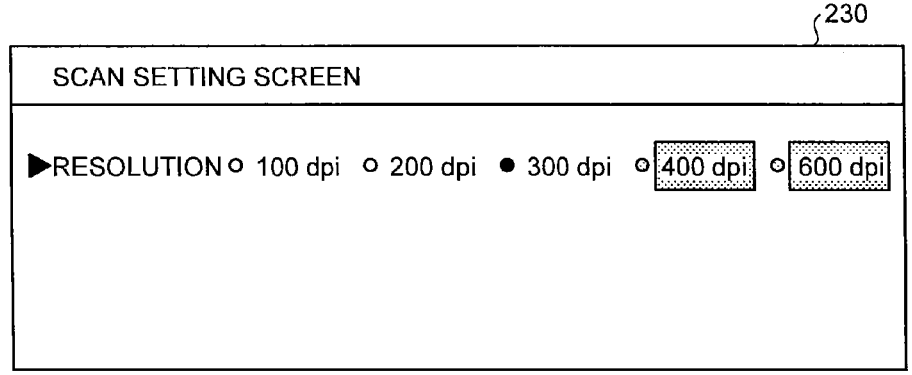

SCREEN DISPLAY METHOD, INFORMATION PROCESSING APPARATUS, AND COMPUTER PROGRAM PRODUCT

CROSS-REFERENCE TO RELATED APPLICATIONS

This application is a continuation of U.S. Ser. No. 12/399,563 filed Mar. 6, 2009, now U.S. Pat. No. 8,248,427 which claims priority under 35 U.S.C. §119 to Japanese priority document 2008-066007 filed in Japan on Mar. 14, 2008, the entire contents of both of which are incorporated herein by reference.

BACKGROUND OF THE INVENTION

1. Field of the Invention

The present invention relates to a technology for displaying a customized screen in a screen display system.

2. Description of the Related Art

Recently, a multifunction peripheral (MFP) that includes functions of a copier, a facsimile (FAX), a printer, and a scanner in a single housing is required to have a function for customizing various device drivers such as a printer driver and a display driver to satisfy diversified users' needs.

A conventional technology for accurately and easily customizing various device drivers is disclosed in, for example, Japanese Patent Application Laid-open No. 2006-309726. In the conventional technology, version information about a printer driver to be customized is acquired and whether the acquired version information corresponds to the latest version or versions that can satisfy users' needs is determined, so that the printer driver is customized based on determination about the version information.

However, the above conventional technology is only for determining whether installed versions of target device drivers correspond to versions that can satisfy users' needs. Therefore, while there is an increasing demand for customizing contents of a screen such as an operation panel, the conventional technology is not effective to meet such demands. More particularly, users are not allowed to determine whether to display buttons or panels used for specifying and inputting various setting information, such as sheet setting or image density, or change positions of the buttons or the panels. Thus, available customization has been limited.

SUMMARY OF THE INVENTION

It is an object of the present invention to at least partially solve the problems in the conventional technology.

According to one aspect of the present invention, there is provided a screen display method for a screen display system in which an image forming apparatus is connected to an information processing apparatus via a communication network. The screen display method includes first screen displaying including the image forming apparatus displaying a setting screen containing setting information for forming an image; setting storing including the image forming apparatus storing screen setting information containing the setting information and information on a configuration of the setting screen; setting obtaining including the image forming apparatus obtaining the screen setting information stored at the setting storing updating the screen setting information with customized screen setting information for configuring a setting display containing customized setting information that is obtained by customizing the setting information contained in the setting display; and first setting information transmitting/receiving including the image forming apparatus transmitting the screen setting information to the information processing apparatus and receiving the customized screen setting information from the information processing apparatus; second setting information transmitting/receiving including the information processing apparatus receiving the screen setting information from the image forming apparatus and transmitting the customized screen setting information to the image forming apparatus; default-setting storing including the information processing apparatus storing default screen setting information containing default setting information that is to be referred to when the screen setting information is customized and information on a configuration of a setting screen containing the default setting information; setting-information generating including the information processing apparatus generating, upon detecting a difference between the setting information contained in the screen setting information received at the second setting information transmitting/receiving and the default setting information contained in the default screen setting information stored at the default-setting storing by comparison with each other, customized screen setting information by coinciding the setting information with the default setting information; second screen displaying including the information processing apparatus displaying a customized setting screen containing the customized screen setting information generated at the setting-information generating; and display controlling including the information processing apparatus causing the second screen displaying to display the customized setting screen based on the customized screen setting information generated at the setting-information generating.

Furthermore, according to another aspect of the present invention, there is provided an information processing apparatus configured to be connected to an image forming apparatus via a network. The information processing apparatus includes a second setting information transmitting/receiving unit that receives screen setting information containing setting information for forming an image and information on a configuration of a setting screen containing the setting information from the image forming apparatus and transmits customized screen setting information containing customized setting information and information on a configuration of a setting screen containing the customized setting information to the image forming apparatus; a default-setting storage unit that stores therein default screen setting information containing default setting information that is to be referred to when the screen setting information is customized and information on a configuration of a setting screen containing the default setting information; a setting-information generating unit that generates, upon detecting a difference between the setting information contained in the screen setting information received by the second setting information transmitting/receiving unit and the default setting information contained in the default screen setting information stored in the default-setting storage unit by comparison with each other, customized screen setting information by coinciding the setting information with the default setting information; a second screen display unit that displays a customized setting screen containing the customized screen setting information generated by the setting-information generating unit; and a display control unit that causes the second screen display unit to display the customized setting screen based on the customized screen setting information generated by the setting-information generating unit.

Moreover, according to still another aspect of the present invention, there is provided a computer program product including a computer-usable medium having computer-readable program codes embodied in the medium for executing a screen display method for a screen display system in which an image forming apparatus is connected to an information processing apparatus via a communication network. The program codes when executed cause a computer to execute first screen displaying including the image forming apparatus displaying a setting screen containing setting information for forming an image; setting storing including the image forming apparatus storing screen setting information containing the setting information and information on a configuration of the setting screen; setting obtaining including the image forming apparatus obtaining the screen setting information stored at the setting storing updating the screen setting information with customized screen setting information for configuring a setting display containing customized setting information that is obtained by customizing the setting information contained in the setting display; and first setting information transmitting/receiving including the image forming apparatus transmitting the screen setting information to the information processing apparatus and receiving the customized screen setting information from the information processing apparatus; second setting information transmitting/receiving including the information processing apparatus receiving the screen setting information from the image forming apparatus and transmitting the customized screen setting information to the image forming apparatus; default-setting storing including the information processing apparatus storing default screen setting information containing default setting information that is to be referred to when the screen setting information is customized and information on a configuration of a setting screen containing the default setting information; setting-information generating including the information processing apparatus generating, upon detecting a difference between the setting information contained in the screen setting information received at the second setting information transmitting/receiving and the default setting information contained in the default screen setting information stored at the default-setting storing by comparison with each other, customized screen setting information by coinciding the setting information with the default setting information; second screen displaying including the information processing apparatus displaying a customized setting screen containing the customized screen setting information generated at the setting-information generating; and display controlling including the information processing apparatus causing the second screen displaying to display the customized setting screen based on the customized screen setting information generated at the setting-information generating.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an example of contents of the screen setting information acquired from the setting screen shown in FIG. 4;

FIG. 6 is an example of contents of default setting information (database) stored in a default-setting storage unit shown in FIG. 1;

FIG. 9 is an example of contents of customized setting information generated by a setting-information generating unit shown in FIG. 1;

FIG. 10 is an example of a customized setting screen containing the customized setting information shown in FIG. 9;

DETAILED DESCRIPTION OF THE PREFERRED EMBODIMENTS

Exemplary embodiments of the present invention are explained in detail below with reference to the accompanying drawings.

In the following embodiments, examples will be used in which the present invention is applied to an image forming apparatus that has a printer function, and more particularly, to a multifunction peripheral (MFP) that includes functions of a copier, a facsimile (FAX), a printer, and a scanner in a single housing. However, the present invention is not limited to the MFP, and can be applied to other apparatuses that include one or more of the above-mentioned functions.

Figure 1:
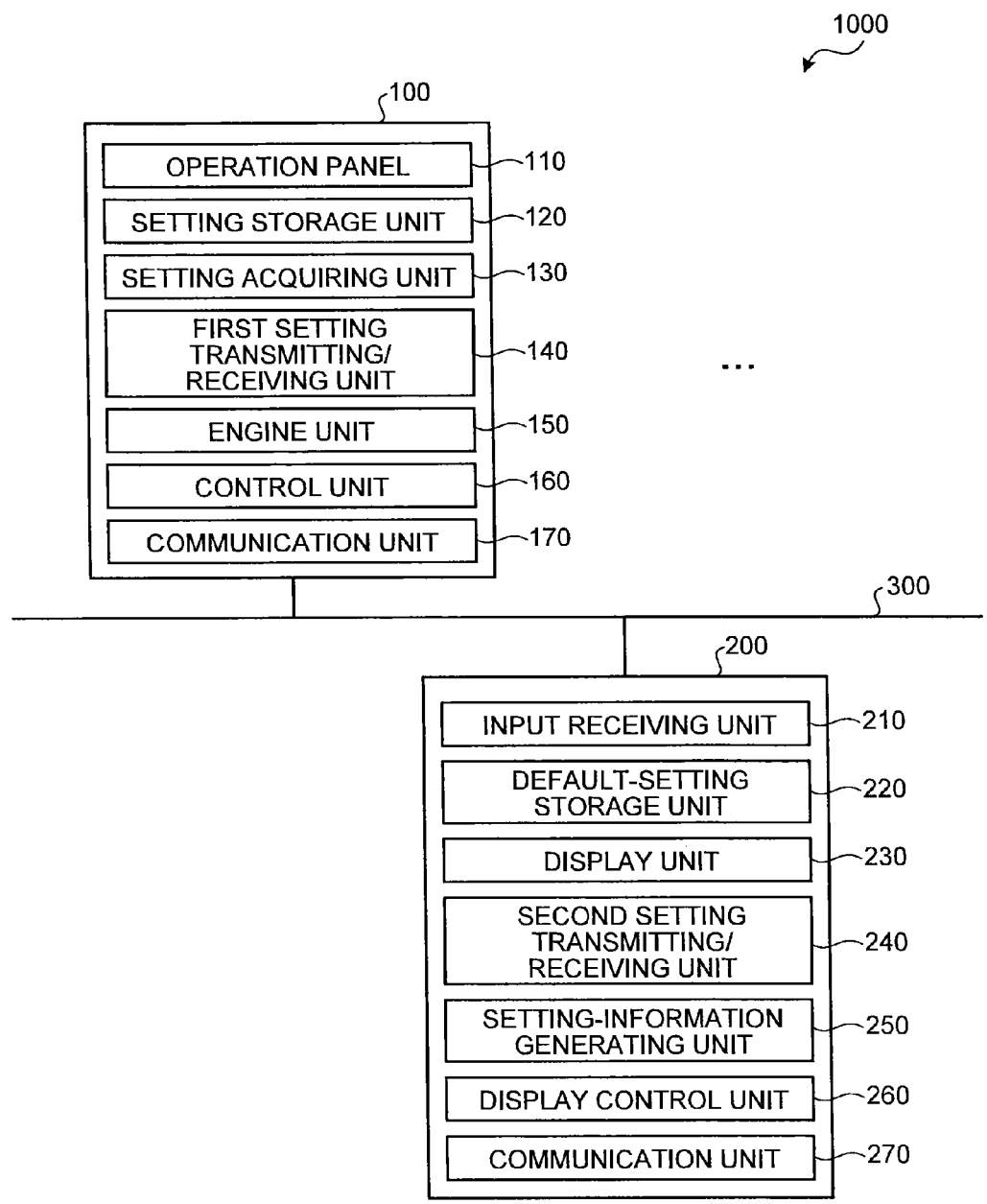
FIG. 1 is a block diagram of a screen display system according to a first embodiment of the present invention.

FIG. 1 is a block diagram of a screen display system 1000 according to a first embodiment of the present invention. The screen display system 1000 includes an MFP 100 and a computer 200 connected to each other via a communication network 300.

The MFP 100 includes an operation panel 110, a setting storage unit 120, a setting acquiring unit 130, a first setting transmitting/receiving unit 140, an engine unit 150, a control unit 160, and a communication unit 170.

The operation panel 110 includes a display device such as a liquid crystal display (LCD), and receives instructions about selection of a scanner, a copier, a printer, or a FAX, and specification and input of various information about sheets, quantity, resolution, and the like, with respect to an original input from a user (hereinafter, the various information is referred to as "setting information").

Figure 2:
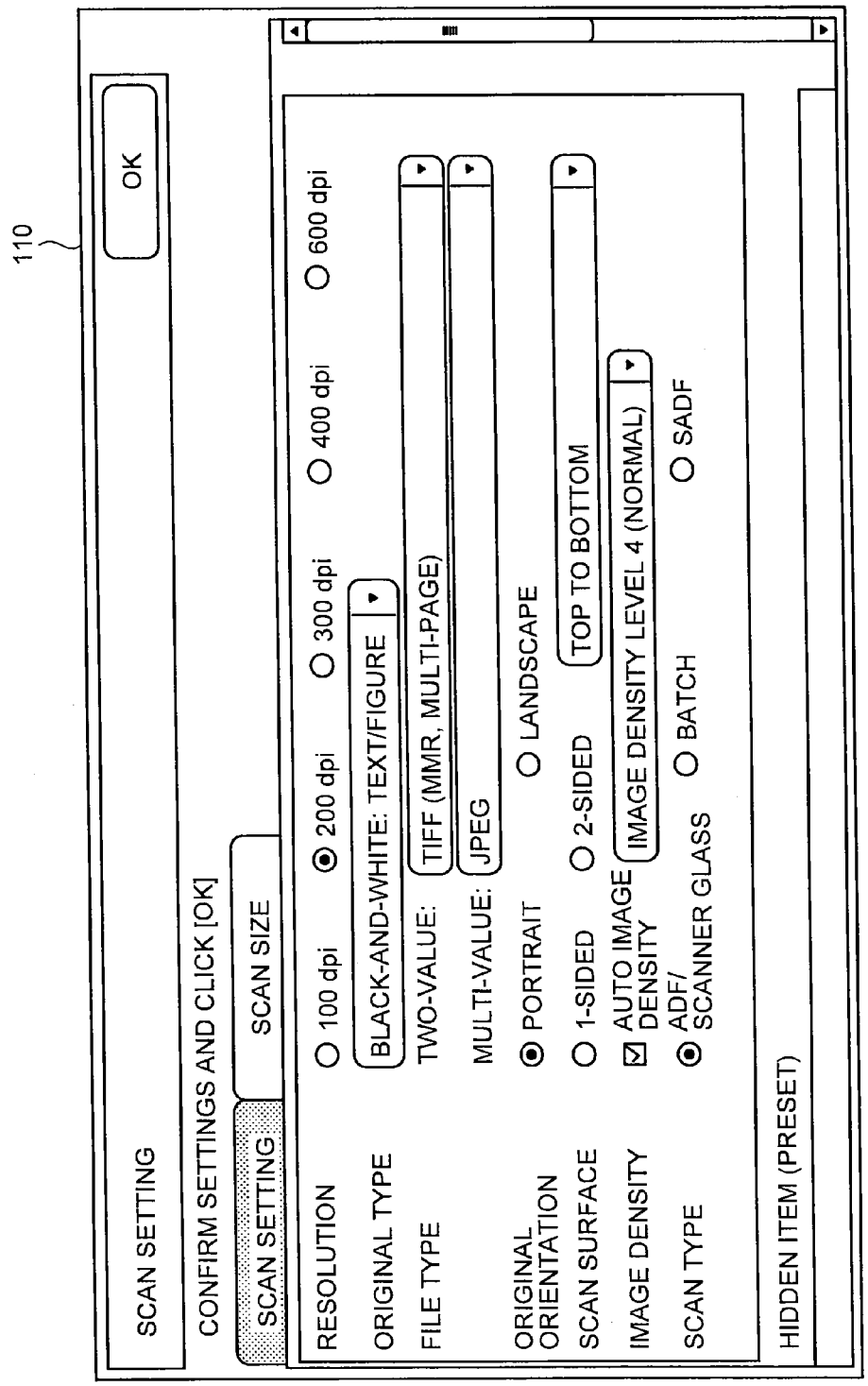
FIG. 2 is an example of an operation panel shown in FIG. 1.

FIG. 2 is an example of a screen containing the setting information (hereinafter, the screen is referred to as "a setting screen") and displayed on the operation panel 110, through which the setting information is specified or input. The setting information contained in the setting screen displayed on the operation panel 110 and information about configuration of the setting screen (e.g., the size of the setting screen) are stored in the setting storage unit 120 in advance. Hereinafter, the setting information and the information about configuration of the setting screen are collectively referred to as "screen setting information".

Figures 3, 4:
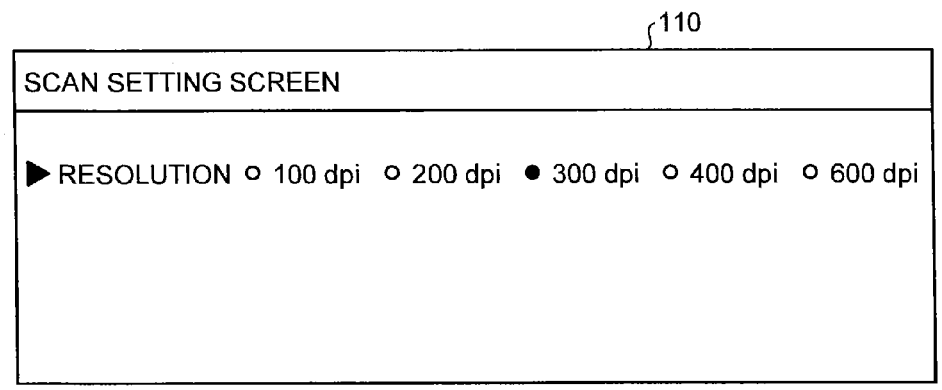
FIG. 3 is an example of contents of setting information stored in a setting storage unit shown in FIG. 1.
FIG. 4 is an example of a setting screen used for generating screen setting information according to the first embodiment.

The setting storage unit 120 is a storage medium such as a hard disk drive (HDD) or a memory for storing therein the screen setting information to be displayed on the operation panel 110. FIG. 3 is an example of contents of the setting information (a part of the setting information of a scanner function) stored in the setting storage unit 120.

Specifically, in the setting storage unit 120, a type of a function of the MFP 100 is stored in a master item cell, settings that can be set for executing the function are stored in a sub item cell, and values that can be set to each of the settings are stored in a sub-sub item cell, in an associated manner.

Besides, the setting storage unit 120 stores therein information about configuration of the setting screen, such as a size (e.g., a width and a height) of a window used for displaying the setting information on the operation panel 110, and identifier (ID) for identifying the MFP 100, in association with the setting information.

The setting acquiring unit 130 acquires, when the first setting transmitting/receiving unit 140 receives a request for acquiring the screen setting information from the computer 200, the setting information and the screen setting information from the setting storage unit 120, and converts the acquired information to an extensile markup language (XML) file.

FIG. 4 is a simplified example of the setting screen of FIG. 2, in which only the setting information about resolution is displayed. FIG. 5 is an example of contents of the setting information obtained after the setting information shown in FIG. 4 is converted to an XML file by the setting acquiring unit 130. As shown in FIG. 5, the setting acquiring unit 130 converts the setting information and values contained in the screen setting information in an associated manner.

Concretely, each of the setting information corresponding to the resolution of 100 dot per inch (dpi), 200 dpi, 300 dpi, 400 dpi, and 600 dpi is enabled (enabled="true" (status information)) and to be displayed (visible="true" (attribute information)) on the setting screen. Further, the setting information corresponding to the resolution of 300 dpi is selected by a user (selected="true").

Returning to the explanation of FIG. 1, the first setting transmitting/receiving unit 140 transmits the screen setting information and the ID for identifying the MFP 100, which are acquired by the setting acquiring unit 130, to the computer 200. Besides, the first setting transmitting/receiving unit 140 receives new screen setting information (hereinafter, "customized screen setting information") obtained after customizing the transmitted screen setting information from the computer 200. The customized screen setting information contains setting information (hereinafter, "customized setting information") obtained after customizing the setting information. The customized screen setting information and the customized setting information will be described later.

The engine unit 150 includes components such as a scanner and a transfer drum that constitute the MFP 100, and performs processes such as scanning or copying of originals based on settings of the setting information instructed by a user by touching the setting screen displayed on the operation panel 110.

The control unit 160 controls the setting acquiring unit 130, the first setting transmitting/receiving unit 140, and the like.

The communication unit 170 includes a communication device such as a network board, through which the MFP 100 and the computer 200 communicate with each other.

The computer 200 includes an input receiving unit 210, a default-setting storage unit 220, a display unit 230, a second setting transmitting/receiving unit 240, a setting-information generating unit 250, a display control unit 260, and a communication unit 270.

The input receiving unit 210 includes an input device such as a keyboard and a touch panel, and receives an input of a request for acquiring the screen setting information of the MFP 100 from a user. Besides, the input receiving unit 210 receives instruction about a magnification ratio of a customized setting screen, which will be described later, from a user when the display control unit 260 needs to change the magnification of the customized setting screen to be displayed on the display unit 230. The input receiving unit 210 also receives an input of confirmation of the contents of the customized setting screen from a user after the customized setting screen is displayed on the display unit 230.

The default-setting storage unit 220 is a recording medium such as an HDD or a memory for storing therein setting information (hereinafter, "default setting information") to be referred to when the setting information received from the MFP 100 is customized. The default setting information is stored in the default-setting storage unit 220 in association with the ID and the setting screen of the MFP 100, and to be customized depending on customization by a user.

FIG. 6 is a diagram for explaining how the default setting information, the setting screen, and the ID of the MFP 100 are associated when stored in the default-setting storage unit 220. Concretely, the default-setting storage unit 220 stores therein "ProjectID" that is the ID for identifying the MFP 100, "Profile ID" for identifying the setting screen of the MFP 100, and "PluginInstanceID" for identifying the setting information contained in the setting screen, in an associated manner. Further, although not shown in FIG. 6, default screen setting information of the setting screen is stored in association with "ProjectID" and values of the setting information are stored in association with "Profile ID".

Figures 7, 8:
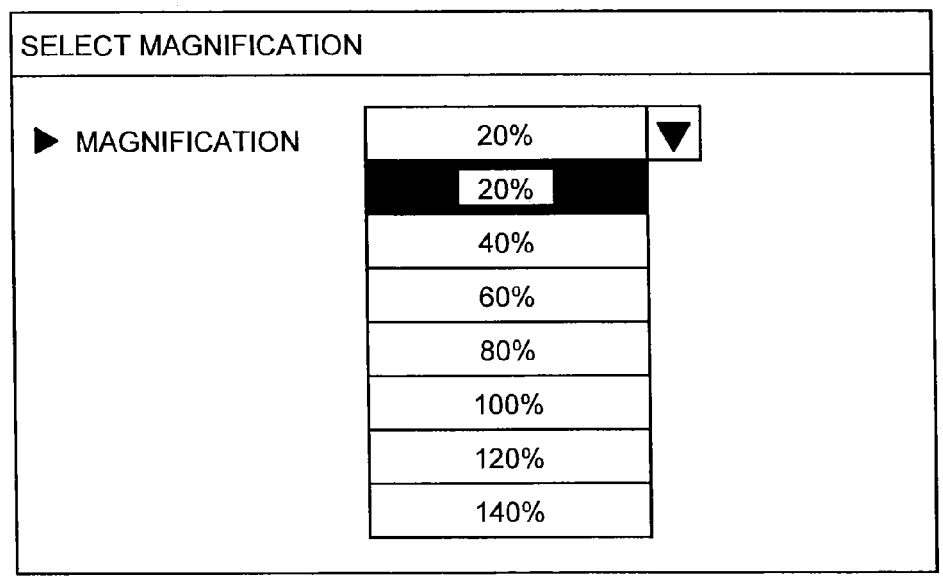
FIG. 7 is an example of contents of default setting information (XML) stored in the default-setting storage unit shown in FIG. 1.
FIG. 8 is an example of a screen magnification setting window displayed on a display unit shown in FIG. 1.

In the following description, it is assumed that the ID of the MFP 100, the setting screen, and the setting information are stored in a table format such as a database table as shown in FIG. 6. However, the above information can be stored in an XML file as shown in FIG. 7 in an associated manner. The default-setting storage unit 220 also stores therein a screen size of the display unit 230 in addition to the above-described information (the default setting information or the like).

Returning to the explanation of FIG. 1, the display unit 230 includes a display device such as an LCD, and displays the customized setting screen containing customized screen setting information generated by the setting-information generating unit 250, which will be described later. Upon determining that the magnification of the customized setting screen containing the customized screen setting information generated by the setting-information generating unit 250 needs to be changed because the size of the customized setting screen is different from a display size of the display unit 230, and if manual setting is specified for changing the magnification, the display unit 230 displays a sub window (magnification window) as shown in FIG. 8 for enabling a user to specify a magnification to change the display size of the customized setting screen.

The second setting transmitting/receiving unit 240 receives the screen setting information and the ID of the MFP 100 from the MFP 100. Besides, the second setting transmitting/receiving unit 240 transmits the customized screen setting information generated by the setting-information generating unit 250 and to be contained in the customized setting screen to the MFP 100.

When the second setting transmitting/receiving unit 240 receives the screen setting information and the ID of the MFP 100 from the MFP 100, the setting-information generating unit 250 identifies "ProjectID" associated with the ID of the MFP 100 from the default-setting storage unit 220, and then acquires the default screen setting information associated with the identified "ProjectID". Subsequently, the setting-information generating unit 250 determines whether there is a difference between the setting information contained in the screen setting information received by the second setting transmitting/receiving unit 240 and the default setting information contained in the default screen setting information. Upon determining that there is a difference between the setting information and the default setting information, the setting-information generating unit 250 stores the customized screen setting information in a random access memory (RAM) (not shown). Here, the customized screen setting information contains the customized setting information that is obtained by updating values of the default setting information based on the setting information.

Upon determining that there is no difference between the setting information contained in the screen setting information received by the second setting transmitting/receiving unit 240 and the default setting information contained in the default screen setting information, the setting-information generating unit 250 stores the screen setting information received by the second setting transmitting/receiving unit 240 as the customized screen setting information in the RAM (not shown)

Upon receiving input of confirmation of the contents of the customized setting screen from a user after the display control unit 260 displays the customized setting screen on the display unit 230, the setting-information generating unit 250 generates the customized screen setting information containing the customized setting information based on the updates setting screen displayed on the display unit 230.

FIG. 9 is an example of contents of the customized setting information contained in the customized screen setting information generated by the setting-information generating unit 250 based on the customized setting screen. In the customized setting information, the setting information corresponding to the resolution of 400 dpi and 600 dpi are disabled (enabled="false"). Concretely, although the second setting transmitting/receiving unit 240 receives the setting information in which the resolutions of 400 dpi and 600 dpi are enabled from the MFP 100, the customized setting information indicates that the setting information corresponding to the resolutions of 400 dpi and 600 dpi are changed to disabled, which means the setting information has been customized.

FIG. 10 is a simplified example of the customized setting screen containing the customized setting information shown in FIG. 9. Portions corresponding to the setting information of the resolutions of 400 dpi and 600 dpi are displayed in a color whose luminance is different from that of portions corresponding to the resolutions of 100 dpi to 300 dpi. In other words, a user is prohibited from specifying the resolutions of 400 dpi and 600 dpi from the operation panel 110. While the portions corresponding to the setting information of the resolutions of 400 dpi and 600 dpi are displayed in a different color, it is also applicable to hidden these setting information by displaying the portions in a background color or with a background pattern.

The display control unit 260 compares a screen size of the customized setting screen containing the customized screen setting information, which contains the customized setting information generated by the setting-information generating unit 250 and is stored in the RAM (not shown), with the screen size of the display unit 230 stored in the default-setting storage unit 220. The display control unit 260 then determines whether a ratio of the customized setting screen containing the customized screen setting information to the display unit 230 is out of a predetermined range.

Upon determining that the ratio is out of the predetermined range and the magnification of the customized setting screen needs to be changed, the display control unit 260 determines whether the screen size of the customized setting screen is to be changed manually or automatically. Upon determining that the screen size is to be changed manually, the display control unit 260 displays, on the display unit 230, the sub window as shown in FIG. 8 for enabling a user to specify a magnification to change the display size of the customized setting screen. When a magnification is specified via the sub window, the display control unit 260 displays the customized setting screen containing the customized screen setting information stored in the RAM on the display unit 230 in accordance with the screen size of the display unit 230.

On the other hand, upon determining that the ratio is out of the predetermined range and the screen size of the customized setting screen is to be changed automatically, the display control unit 260 either enlarges or reduces the screen size of the customized setting screen to the screen size of the display unit 230, which is stored in the default-setting storage unit 220. Then, the display control unit 260 displays the enlarged or reduced customized setting screen on the display unit 230.

The communication unit 270 includes a communication device such as a network board, through which the MFP 100 and the computer 200 communicate with each other.

The communication network 300 is a communication line such as a local area network (LAN) or a wide area network (WAN).

A process performed by the screen display system 1000 is described below.

Figure 11A:
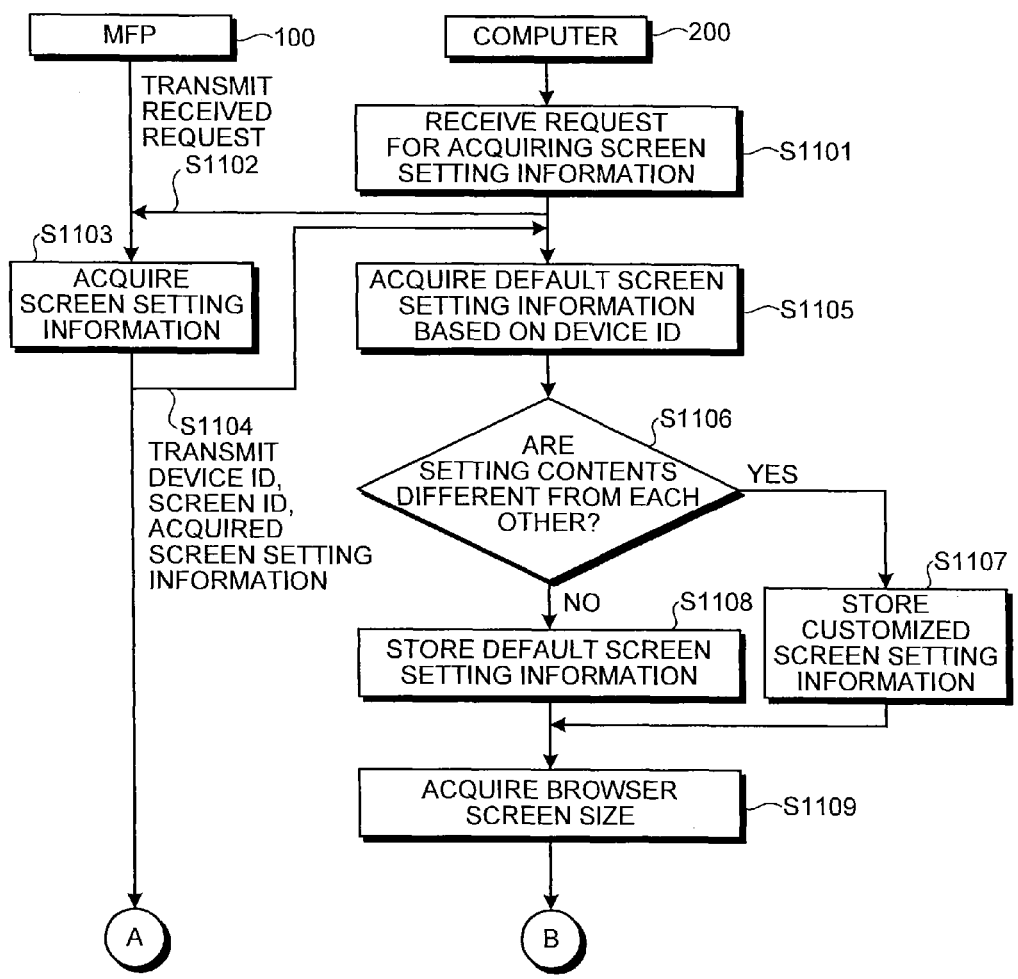
FIG. 11 is a flowchart of a process procedure for customizing a setting screen by the screen display system shown in FIG. 1.
Figure 11B:
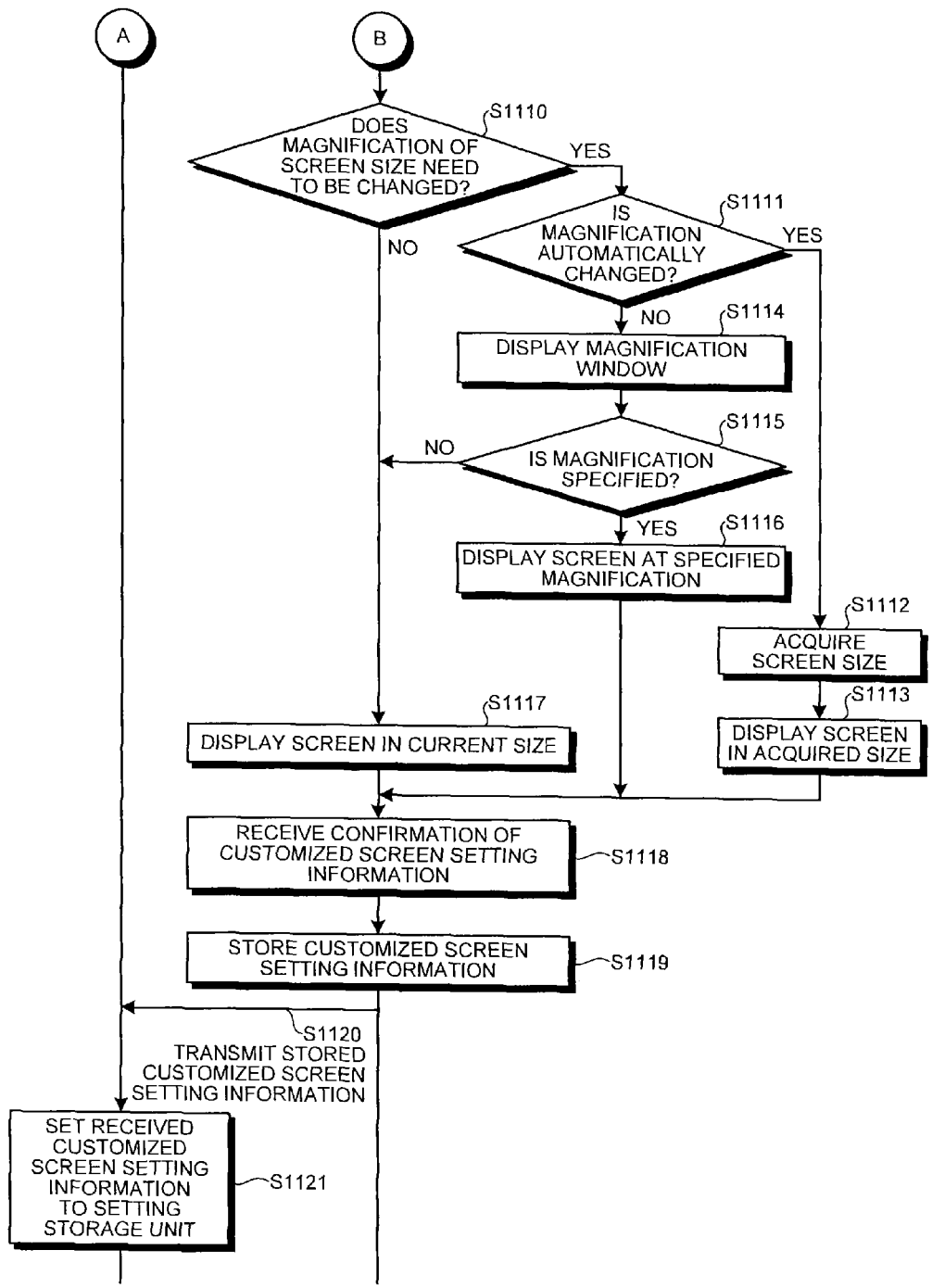

FIG. 11 is a flowchart of a process procedure for customizing the settings of the operation panel 110 of the MFP 100 from the computer 200, which start by acquiring the screen setting information of the operation panel 110 and ends by resetting the customized screen setting information to the MFP 100.

The input receiving unit 210 receives an input of a request for acquiring the screen setting information of the MFP 100 from a user operating the computer 200 (Step S1101). The second setting transmitting/receiving unit 240 transmits the received request to the MFP 100 (Step S1102).

Upon receiving the request transmitted from the computer 200, the first setting transmitting/receiving unit 140 acquires the screen setting information and the ID of the MFP 100 stored in the setting storage unit 120 (Step S1103). The first setting transmitting/receiving unit 140 transmits the acquired screen setting information and the ID of the MFP 100 to the computer 200 (Step S1104).

Upon receiving the screen setting information and the ID of the MFP 100 from the MFP 100, the second setting transmitting/receiving unit 240 identifies "ProjectID" corresponding to the received ID of the MFP 100 and acquires the default screen setting information associated with the identified "ProjectID" (Step S1105).

The setting-information generating unit 250 determines whether there is a difference between the screen setting information transmitted at Step S1104 and the default screen setting information acquired at Step S1105 (Step S1106). Upon determining that there is a difference (YES at Step S1106), the setting-information generating unit 250 updates values of the default setting information with values of the setting information, and stores the customized setting information, that is, the customized screen setting information containing the customized setting information in the RAM (Step S1107).

On the other hand, upon determining that there is no difference between the screen setting information and the default screen setting information, which received by the second setting transmitting/receiving unit 240 (NO at Step S1106), the setting-information generating unit 250 stores the default screen setting information as the customized screen setting information in the RAM (Step S1108).

After the customized screen setting information is stored in the RAM at either Step S1107 or Step S1108, the display control unit 260 compares the screen size of the customized setting screen containing the customized screen setting information stored at Step S1107 or Step S1108 with the screen size of the display unit 230, which is stored in the default-setting storage unit 220. Then, the display control unit 260 determines whether the ratio of the customized setting screen containing the customized screen setting information to the display unit 230 is out of a predetermined range and whether the magnification of the customized setting screen needs to be changed (Step S1110). Upon determining that the ratio is out of the predetermined range and the magnification of the customized setting screen needs to be changed (YES at Step S1110), the setting-information generating unit 250 determines whether the screen size of the customized setting screen is to be changed manually or automatically (Step S1111).

Upon determining that the screen size of the customized setting screen is to be changed automatically (YES at Step S1111), the display control unit 260 acquires the screen size of the display unit 230 from the default-setting storage unit 220 (Step S1112). Then, the display control unit 260 enlarges or reduces the screen size of the customized setting screen containing the customized screen setting information stored at Step S1107 or Step S1108 to the screen size acquired at Step S1112, and displays the enlarged or reduced customized setting screen on the display unit 230 (Step S1113).

On the other hand, upon determining that the screen size of the customized setting screen is to be changed manually (NO at Step S1111), the setting-information generating unit 250 displays the sub window for enabling a user to specify a magnification to change the display size of the customized setting screen (Step S1114).

The display control unit 260 determines whether the input receiving unit 210 has received an input of specification of the magnification via the sub window (Step S1115). Upon determining that the input of specification of the magnification has been received (YES at Step S1115), the display control unit 260 displays the customized setting screen containing the customized screen setting information stored in the RAM on the display unit 230 in accordance with the screen size of the display unit 230 (Step S1116).

On the other hand, upon determining that the ratio of the customized setting screen to the display unit 230 is within the predetermined range (NO at Step S1110), or upon determining that an input of specification of the magnification ahs not received (NO at Step S1115), the display control unit 260 displays the customized setting screen containing the customized screen setting information stored in the RAM on the display unit 230 in a current display size (Step S1117).

When the input receiving unit 210 receives an input of confirmation of the setting contents of the customized setting screen displayed on the display unit 230 from the user (Step S1118), the setting-information generating unit 250 stores the customized screen setting information contained in the customized setting screen in the default-setting storage unit 220 (Step S1119). The second setting transmitting/receiving unit 240 then transmits the customized screen setting information stored at Step S1119 to the MFP 100 (Step S1120).

The setting acquiring unit 130 sets the customized screen setting information transmitted from the computer 200 to the setting storage unit 120 (Step S1120). Upon completing the process at step S1120, all the process procedure is completed. As a result, the setting information of the operation panel 110 is changed, that is, customized by the user.

As described above, the screen display system includes the MFP 100 and the computer 200 connected to each other via the communication network 300. The MFP 100 includes the operation panel 110 that displays a setting screen containing setting information that is used for forming an image, the setting storage unit 120 that stores therein screen setting information containing the setting information and information about configuration of the setting screen, the setting acquiring unit 130 that acquires the screen setting information from the setting storage unit 120 and updates the screen setting information customized screen setting information containing customized setting information and information about configuration of a setting screen containing the customized setting information is obtained, and the first setting transmitting/receiving unit 140 that transmits the screen setting information to the computer 200 and receives the customized screen setting information from the computer 200. Meanwhile, the computer 200 includes the second setting transmitting/receiving unit 240 that receives the screen setting information from the MFP 100 and transmits the customized screen setting information to the MFP 100, the default-setting storage unit 220 that stores therein default screen setting information containing default setting information that is to be referred to when the screen setting information is customized and information about configuration of a setting screen containing the default setting information, the setting-information generating unit 250 that generates, upon detecting a difference between the setting information and the default setting information by comparison with each other, customized screen setting information by coinciding the setting information with the default setting information, the display unit 230 that displays a customized setting screen containing the customized screen setting information, and the display control unit 260 causes the setting-information generating unit 250 to display the customized setting screen based on the customized screen setting information. Therefore, the setting screen and the contents of the setting screen can be easily customized according to users' needs.

Furthermore, the display control unit 260 changes the screen size of the customized setting screen containing the customized screen setting information generated by the setting-information generating unit 250 to a screen size that can be displayed on the display unit 230, and displays the customized setting screen in the changed size. Therefore, even when a screen to be customized by a user is smaller or larger than a screen of a display device, the customized screen can be easily displayed and viewed by a user.

The first embodiment is so configured that the screen setting information stored in the MFP 100 is compared with the default screen setting information stored in the computer 200 and a difference between the screen setting information and the default screen setting information is automatically customized. Thus, the customized screen setting information is easily generated. However, there is a further demand from a user for changing a position of the setting information. Therefore, a second embodiment of the present invention is configured so that when receiving a request for changing a position of the setting information, the setting screen is customized by generating customized screen setting information in which the position of the setting information is changed based on the received request.

Figure 12:
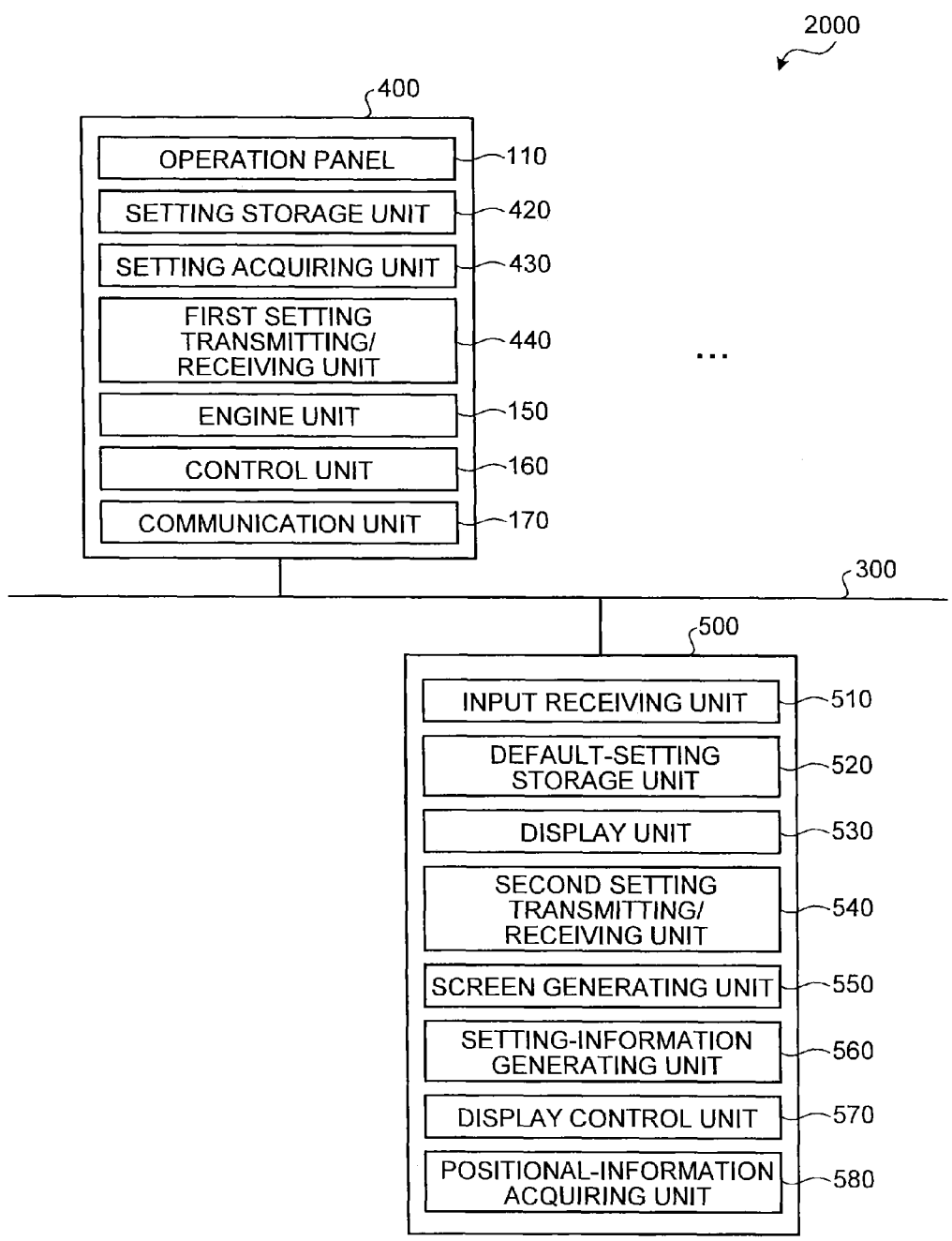
FIG. 12 is a block diagram of a screen display system according to a second embodiment of the present invention.

FIG. 12 is a block diagram of a screen display system 2000 according to the second embodiment. The screen display system 2000 includes an MFP 400 and a computer 500 connected to each other via the communication network 300. The MFP 400 is different from the MFP 100 in that it includes a setting storage unit 420, a setting acquiring unit 430, and a first setting transmitting/receiving unit 440, which are different from the setting storage unit 120, the setting acquiring unit 130, and the first setting transmitting/receiving unit 140. The computer 500 is different from the computer 200 in that it includes an input receiving unit 510, a default-setting storage unit 520, a display unit 530, a second setting transmitting/receiving unit 540, a screen generating unit 550, a setting-information generating unit 560, a display control unit 570, and a positional-information acquiring unit 580, all of which are different from the units of the computer 200. In the following description, the same reference numerals are assigned to the components same as those of the first embodiment, and the same explanation is not repeated.

Figure 13:
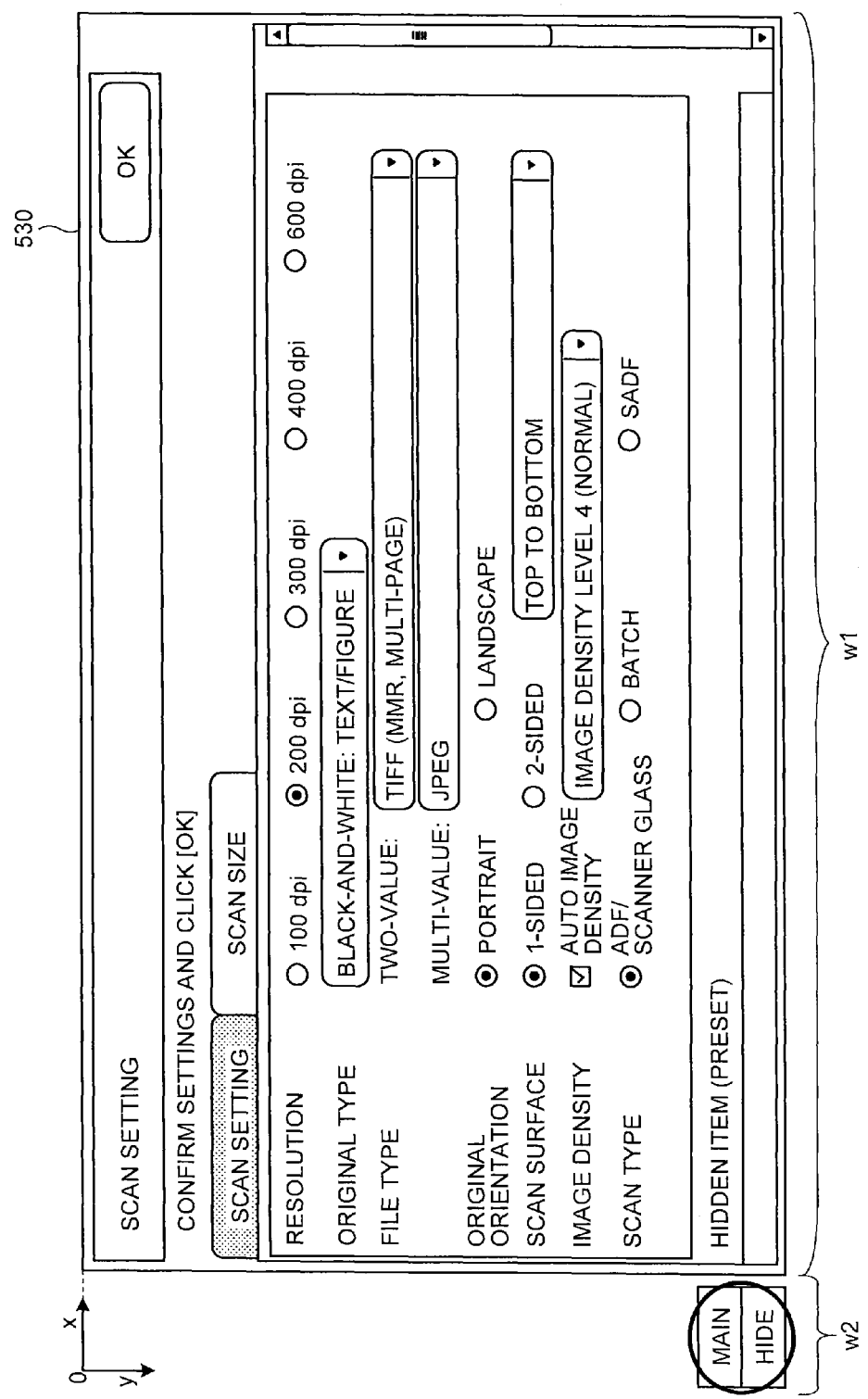
FIG. 13 is an example of a customized setting screen displayed on a display unit shown in FIG. 12.

The setting storage unit 420 stores therein positional information indicating a position of the setting information as well as the same information as that stored in the setting storage unit 120, in association with the setting information. The positional information is represented by, for example, coordinates whose original point is set to the upper left corner of the setting screen as shown in FIG. 13.

The setting acquiring unit 430 acquires the positional information and the associated setting information as well as the same information as that acquired by the setting acquiring unit 130.

The first setting transmitting/receiving unit 440 transmits and receives the positional information and the associated setting information as well as the information same as that transmitted and received by the first setting transmitting/receiving unit 140. The units in the MFP 400 are firstly explained below.

The input receiving unit 510 receives an instruction for changing the position of the setting information displayed on the display unit 530 when the setting-information generating unit 560 displays the customized setting screen containing the customized screen setting information stored in the RAM, as well as the same input as that received by the input receiving unit 210. The instruction is, for example, an operation to drag and drop the setting information by using a mouse.

The default-setting storage unit 520 stores therein positional information indicating a position of the default setting information (hereinafter, "default positional information), as well as the same information as that stored in the default-setting storage unit 220, in association with the default setting information.

The display unit 530 displays a sub window for enabling a user to hide the customized setting information contained in the customized setting screen displayed by the setting-information generating unit 560, as well as the same information as that displayed by the display unit 230.

FIG. 13 is an example of the customized setting screen (w1) and the sub window (w2) for enabling a user to hide the customized setting information, which are displayed on the display unit 530. A user can hide the customized setting information by moving the customized setting information to the sub window (w2) through inputting of an instruction, for example, drag and drop operation, to the input receiving unit 510. Due to the sub window (w2), even when the size of the customized setting screen is too large to be displayed on the display unit 530, a user can customize the customized setting screen (w1) so that only desired pieces of the customized setting information can be displayed on the display unit 530.

The second setting transmitting/receiving unit 540 transmits and receives positional information indicating a position of the customized setting information (hereinafter, "customized positional information"), as well as the same information transmitted and received by the second setting transmitting/receiving unit 240.

The screen generating unit 550 generates the customized setting information containing the customized positional information calculated by the positional-information acquiring unit 580, which will be described later, as well as the same customized setting information as that generated by the setting-information generating unit 250.

The setting-information generating unit 560 controls display of the customized setting information as well as the same operation as that controlled by the display control unit 260. Concretely, upon receiving an instruction for changing a position of the customized setting information via the input receiving unit 510, the setting-information generating unit 560 controls display of the customized setting information so that the customized setting information is moved to the instructed position. Besides, when the instruction received by the input receiving unit 510 is for moving the customized setting information to the sub window (w2), the setting-information generating unit 560 performs control so that the moved customized setting information is to be hidden.

The positional-information acquiring unit 580 calculates, when the customized setting information displayed on the display unit 530 is moved due to the instruction input to the input receiving unit 510, the position of the moved customized setting information by calculating the difference between a start point and an end point on the coordinates indicated in FIG. 13.

Figure 14A:
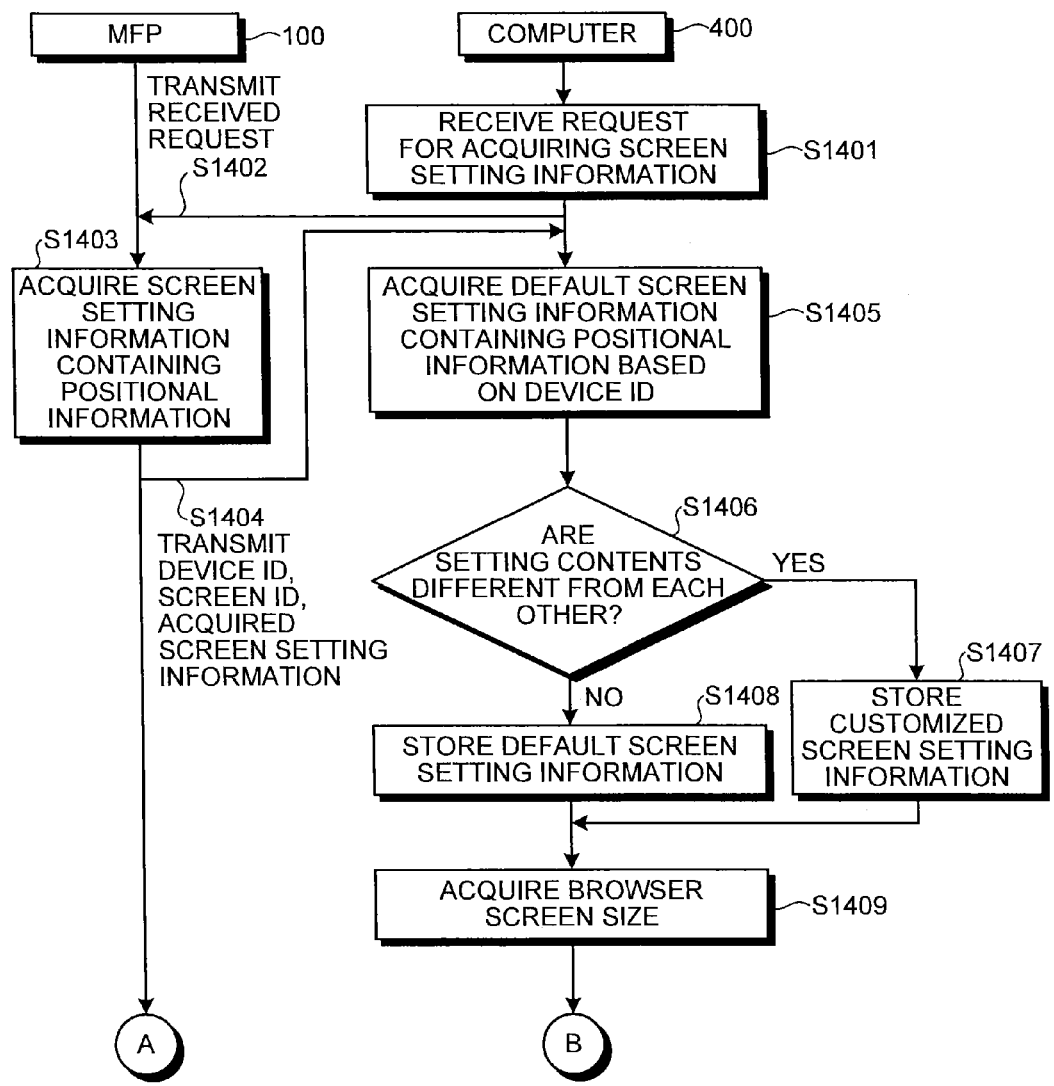
FIG. 14 is a flowchart of a process procedure for customizing a setting screen by the screen display system shown in FIG. 12.
Figure 14B:
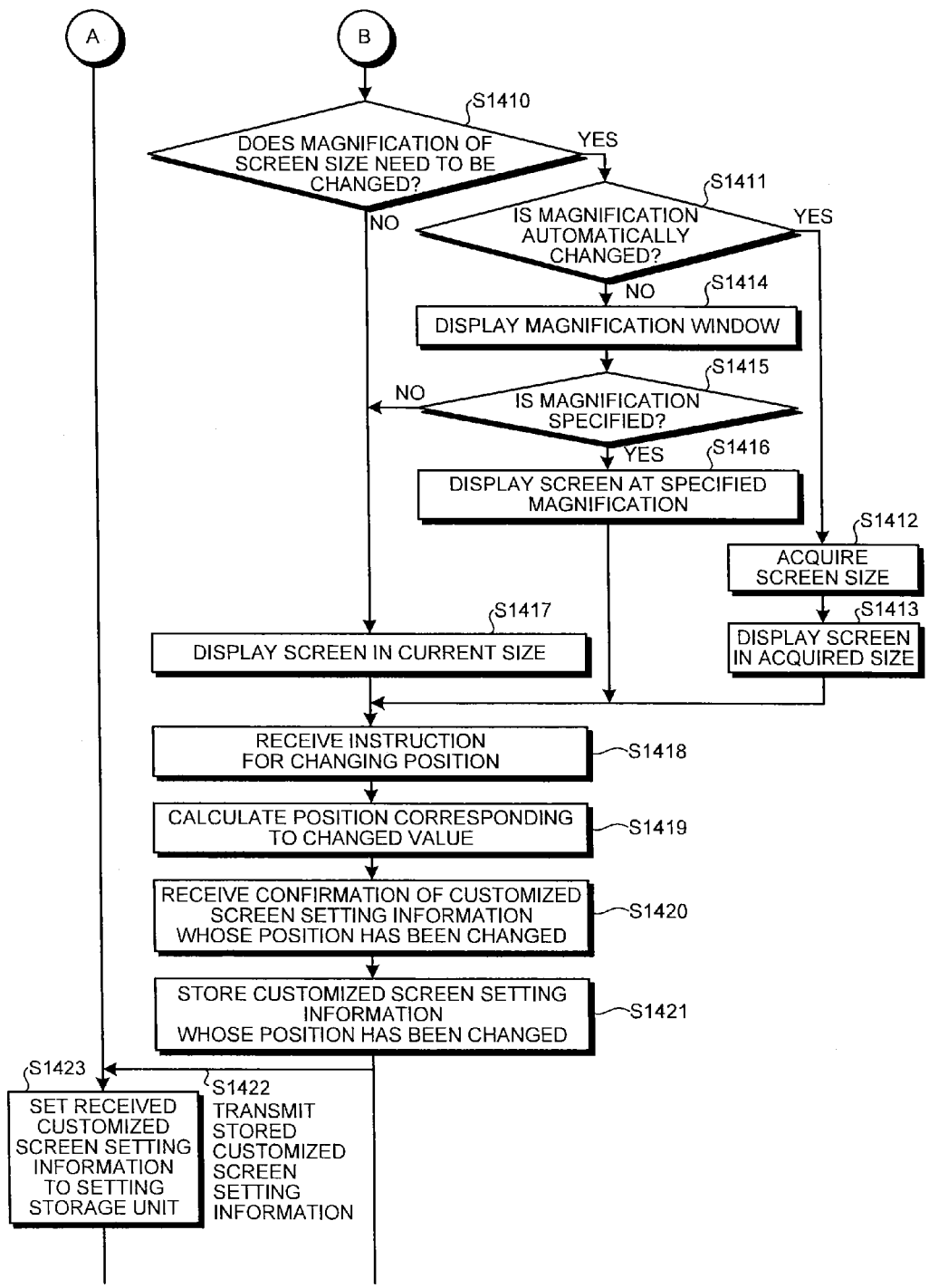

A process performed by the screen display system 2000 is described below. The process is different from that performed by the screen display system 1000 in that it includes a process for moving the customized setting information to a position instructed by a user and generating the customized screen setting information containing the moved customized setting information. Therefore, only the different processes are described with reference to FIG. 14, and explanation about the same processes (Steps S1401, S1402, S1406 to S1417, and S1423) as those of the first embodiment are omitted.

When the first setting transmitting/receiving unit 440 receives a request transmitted from the computer 500, the setting acquiring unit 430 acquires the screen setting information containing the positional information and the ID of the MFP 400 (Step S1403). The first setting transmitting/receiving unit 440 transmits the acquired screen setting information containing the positional information, and the ID of the MFP 400 to the computer 500 (Step S1404).

Upon receiving the screen setting information containing the positional information, and the ID of the MFP 400 from the MFP 400, the second setting transmitting/receiving unit 540 identifies "ProjectID" corresponding to the ID of the MFP 400 from the default-setting storage unit 520, and then acquires the default screen setting information containing the default positional information associated with the identified "ProjectID" (Step S1405). Then, processes at Steps S1406 to S1417 are performed similar to those of the first embodiment.

When the customized setting screen is displayed on the display unit 530, the input receiving unit 510 receives an input of an instruction for changing a position of the customized setting information from a user (Step S1418). Then, the positional-information acquiring unit 580 determines a position to which the customized setting information is moved by calculating the difference between a start point and an end point of the customized setting information with respect to the coordinates (Step S1419).

When the input receiving unit 510 receives an input of confirmation of the setting contents of the customized setting screen containing the customized setting information whose position has been changed from a user (Step S1420), the screen generating unit 550 stores the customized screen setting information contained in the customized setting screen in the default-setting storage unit 520 (Step S1421). The second setting transmitting/receiving unit 540 transmits the customized screen setting information stored at Step S1421 to the MFP 400 (Step S1422). The process ends by setting the received customized screen setting information to the setting storage unit 420. Thus, a user can customize the position of the setting information as well as the contents of the setting information on an operation panel 410 of the MFP 400.

In this manner, the second embodiment is so configured that the setting information includes the positional information indicating a position of the setting information on the setting screen, the input receiving unit 510 receives an input of an instruction for changing a position of the setting information contained in the customized setting screen displayed on the display unit 530, the positional-information acquiring unit 580 calculates the position of the setting information on the customized setting screen based on the instruction for moving the setting information, which has been received by the input receiving unit 510, and the screen generating unit 550 sets the position on the customized setting screen calculated by the positional-information acquiring unit 580 as the positional information and generates customized screen setting information in which the set positional information is reflected. Thus, a user can easily customize a position of the setting information.

While the first and the second embodiments are described based on assumption that the single MFP 100 and the single MFP 400 are used, it is applicable to use a plurality of the MFPs 100 and the MFPs 400. Specifically, the MFPs (the MFPs 100 or the MFPs 400) can be used in such a configuration that the screen setting information for each of the MFPs is acquired, the setting information contained each pieces of the screen setting information is compared with the default setting information contained in the default screen setting information stored in the computer (the computer 200 or the computer 500), and the customized screen setting information is generated such that all the setting information available for each of the MFPs is displayed on the customized setting screen or such that the setting information of all the MFPs is integrated by setting each piece of the customized setting information to be displayed or hidden depending on the type of the MFPs.

Figure 15:
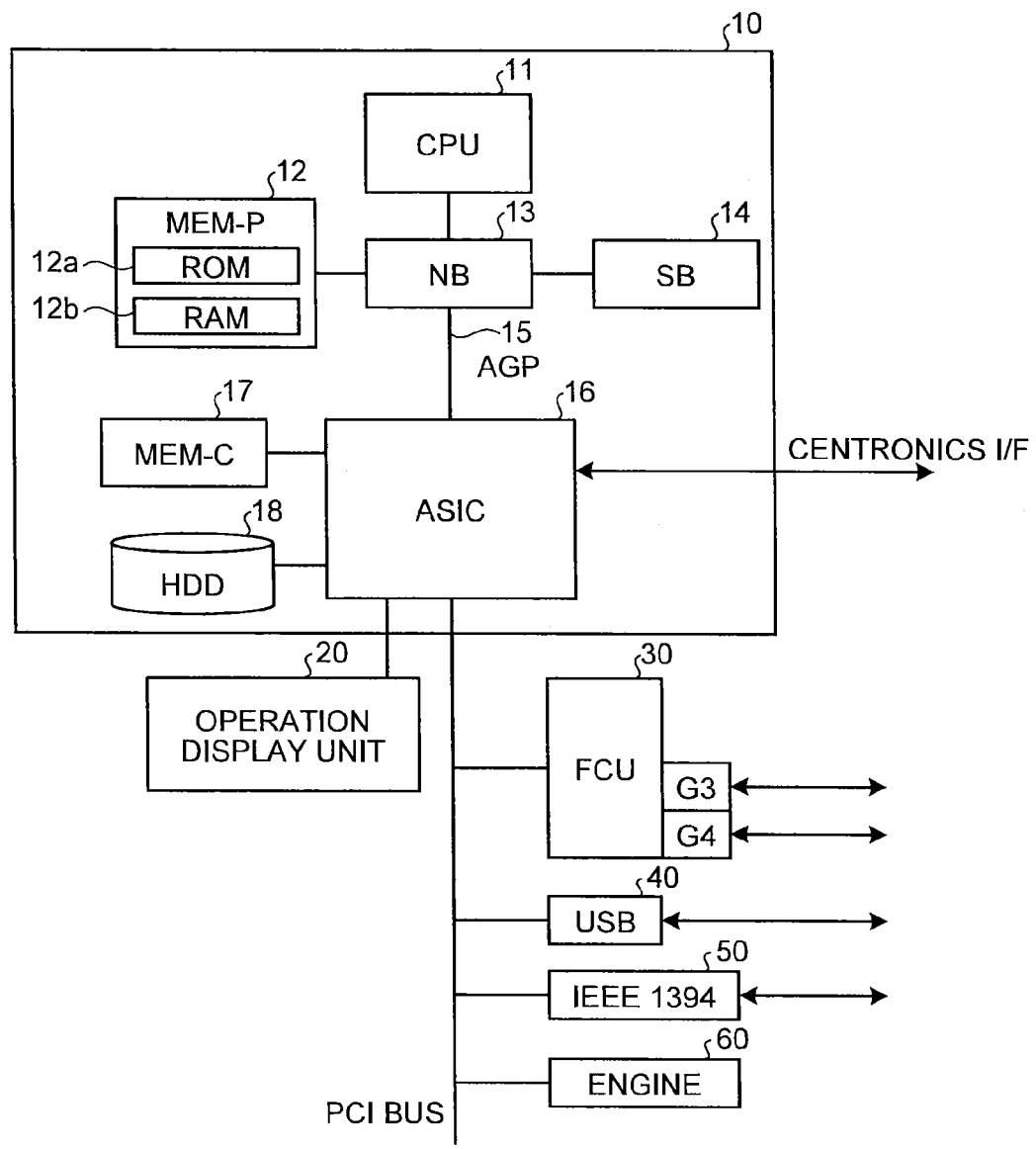
FIG. 15 is a block diagram of hardware configuration of each of multifunction peripherals shown in FIGS. 1 and 12.

FIG. 15 is a block diagram of hardware configuration of each of the MFPs 100 and 400. Each of the MFPs 100 and 400 includes a controller 10 and an engine unit (engine) 60. The controller 10 and the engine 60 are connected to each other via a peripheral component interconnect (PCI) bus. The controller 10 controls each of the MFPs 100 and 400, and operations such as drawing, communication and input from an operating unit (not shown). The engine 60 includes a printer engine (an engine unit) connectable to the PCI bus. Examples of the engine 60 include a black-and-white plotter, one-drum color plotter, four-drum color plotter, a scanner unit, and a FAX unit. The engine 60 also includes an image processing unit (not shown) that performs error diffusion, gamma correction, and the like, in addition to the engine unit such as a plotter.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and an HDD 18. The NB 13 and the ASIC 16 are connected to each other via an accelerated graphic port (AGP) bus 15. The MEM-P 12 includes a ROM 12a and a RAM 12b.

The CPU 11 controls the entire MFPs 100 and 400. The CPU 11 includes a chip set constituted of the NB 13, the MEM-P 12, and the SB 14, and connected to other devices via the chip set.

The NB 13 is a bridge for connecting the CPU 11, the MEM-P 12, the SB 14, and the AGP 15 to one another. The NB 13 includes a memory controller that controls read and write to the MEM-P 12, a PCI master, and an AGP target.

The MEM-P 12 is a system memory used as a storage memory for storing therein computer programs and various data, a load memory for loading the computer programs and various data, and a drawing memory for a printer function. The MEM-P 12 includes the ROM 12a and the RAM 12b. The ROM 12a is a read only memory used as a storage memory for storing therein computer programs and various data. The RAM 12b is a readable and writeable memory used as a load memory for loading the computer programs and various data and a drawing memory for a printer function.

The SB 14 is a bridge for connecting the NB 13, the PCI device, and peripheral devices, to one another. The SB 14 is connected to the NB 13 via the PCI bus to which a network interface (I/F) is also connected.

The ASIC 16 is an integrated circuit (IC) that includes hardware devices for image processing and is used for image processing. The ASIC 16 serves as a bridge for connecting the AGP 15, the PCI bus, the HDD 18, and the MEM-C 17 to one another. The ASIC 16 includes, although not shown, a PCI target, an AGP master, an arbiter (ARB) that is a main component of the ASIC 16, a memory controller that controls the MEM-C 17, a plurality of direct memory access controllers (DMACs) that performs rotation processing or the like on image data by using hardware logic, and a PCI unit that performs data transfer with the engine 60 via the PCI bus. The ASIC 16 is connected to a fax control unit (FCU) 30, a universal serial bus (USB) 40, and an IEEE 1394 I/F 50. An operation display unit 20 is directly connected to the ASIC 16.

The MEM-C 17 is a local memory used as an image buffer for copying and a code buffer. The HDD 18 is a storage unit for storing therein image data, computer programs, font data, format data, and the like.

The AGP 15 is a bus I/F for graphics accelerator card used for enabling a high-speed graphics process. Specifically, the AGP 15 increases a processing speed of the graphics accelerator card by directly accessing the MEM-P 12 with high throughput.

Computer programs to be executed by the MFPs 100 and 400 and the computers 200 and 500 are provided by being stored in a ROM or the like. Alternatively, it is applicable to store the computer programs to be executed by the MFPs 100 and 400 and the computers 200 and 500 in a computer-readable recording medium, such as a CD-ROM, a flexible disk (FD), a CD-R, and a digital versatile disk (DVD), in an installable or an executable format.

Furthermore, it is applicable to store the computer programs to be executed by the MFPs 100 and 400 and the computers 200 and 500 in a computer connected via a network such as the Internet such that the computer programs can be downloaded via the network. Moreover, the computer programs to be executed by the MFPs 100 and 400 and the computers 200 and 500 can be provided and distributed via a network such as the Internet.

The computer programs to be executed by the MFPs 100 and 400 and the computers 200 and 500 have module configuration including the above units (the setting acquiring unit, the first setting transmitting/receiving unit, the second setting transmitting/receiving unit, and the setting-information generating unit). The above units are loaded on a main storage device by the CPU (processor) by reading and executing the computer programs from the ROM. As a result, the setting acquiring unit, the first setting transmitting/receiving unit, the second setting transmitting/receiving unit, and the setting-information generating unit are generated on the main storage device.

While the MFP is used in the above description, the present invention is not limited to the MFP. The present invention can be applied to other apparatuses such as a copier, a facsimile, and a printer.

According to one aspect of the present invention, a screen as well as various setting information on the screen can be easily customized depending on user's needs.

Furthermore, according to another aspect of the present invention, the customized result can be easily viewed by a user even when a customized screen is relatively smaller or larger than a display screen.

Moreover, according to still another aspect of the present invention, the position of the setting information can be easily customized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A screen display method for a screen display system in which a device is connected to an information processing apparatus via a communication network, the screen display method comprising:

transmitting, from the device, screen setting information containing setting information for controlling the functions of the device and information on a configuration of a setting screen containing the setting information and device identification information for identifying the device to the information processing apparatus;

receiving, in the information processing apparatus, the screen setting information and the device identification information from the device;

displaying, on the information processing apparatus, a customized setting screen for receiving a request for customization of the screen setting information on the basis of the setting information contained in the screen setting information received from the device, the customized setting screen including a selection function to select a display position of the setting information displayed on the device or to select a display format, including luminance level of the setting information displayed on the device;

generating, in the information processing apparatus, customized screen setting information based on the request received through the customized setting screen;

transmitting, from the information processing apparatus, the customized screen setting information to the device corresponding to the device identification information;

receiving, in the device, the customized screen setting information from the information processing apparatus;

updating screen setting information stored in the device with the customized screen setting information received from the information processing apparatus; and displaying, on the device, a setting screen according to the screen setting information updated with the customized screen setting information received from the information processing apparatus.

2. The screen display method according to claim 1, wherein the setting information contains status information indicating whether the setting information is enabled, the screen display method further comprises storing, in the information processing apparatus, default setting information to be referred to when the setting information is customized, and the displaying on the information processing apparatus further includes the information processing apparatus comparing the setting information contained in the screen setting information and the default setting information and displaying the customized setting screen according to a result of the comparison.

3. The screen display method according to claim 2, wherein when a setting item or a setting value is set to enabled based on the setting information but is not set to enabled based on the default setting information according to a result of the comparison between the setting information and the default setting information, the displaying on the information processing apparatus further includes the information processing apparatus displaying the customized setting screen by setting the setting item or the setting value to disabled.

4. The screen display method according to claim 3, wherein the setting information contains display attribute information indicating whether the setting information is to be displayed by the displaying on the device, and the displaying on the information processing apparatus further includes the information processing apparatus setting unique luminance to the display attribute information of the setting item or the setting value so that the setting item or the setting value is set to disabled.

5. The screen display method according to claim 1, wherein the displaying on the information processing apparatus further includes the information processing apparatus changing a screen size of the customized setting screen to a size that can be displayed by the displaying on the information processing apparatus and displaying the customized setting screen in a changed size.

6. The screen display method according to claim 4, further comprising:

receiving, in the information processing apparatus, an input of size change information for changing a screen size of the customized setting screen, wherein when the input of the size change information is received, the displaying on the information processing apparatus further includes the information processing apparatus changing a screen size of the customized setting screen based on the size change information and displaying the customized setting screen in a changed size.

7. The screen display method according to claim 6, wherein the setting information contains positional information indicating a position of the setting information on the setting screen, the receiving an input of size change information further includes the information processing apparatus receiving an instruction for moving setting information contained in the customized setting screen displayed by the displaying on the information processing apparatus, the screen display method further comprises calculating a
position, in the information processing apparatus, of the
setting information on the customized setting screen in
response to the instruction, and the generating further includes the information processing
apparatus setting the position calculated at the calculating to the positional information and generating the customized screen setting information based on the positional information.

8. The screen display method according to claim 6, wherein
the screen setting information contains display setting
information indicating whether the setting information
is to be displayed, and the displaying on the information processing apparatus
further includes displaying a display setting screen separated from the customized setting screen, based on the
display setting information contained in the customized
screen setting information, and when setting information is moved to the display setting screen because of the
instruction received at the receiving an input of size
change information, the displaying on the information
processing apparatus further includes the information
processing apparatus hiding the setting information.

9. The screen display method according to claim 1, wherein
the screen setting information and the setting information are
written in an extensible markup language format.

10. An information processing apparatus configured to be
connected to a device via a communication network, the
information processing apparatus comprising:
  a setting transmitting/receiving unit that receives screen
    setting information containing setting information for
    controlling functions of the device and information on a
    configuration of a setting screen from the device and
    receives device identification information for identifying the device from the device;
  a screen display unit that displays a customized setting
    screen for receiving a request for customization of the
    screen setting information on the basis of the setting
    information contained in the screen setting information
    received from the device by the setting transmitting/
    receiving unit, the customized setting screen including a
    selection function to select a display position of the
    setting information displayed on the device or to select a
    display format, including luminance level of the setting
    information displayed on the device; and
  a customized screen setting information generating unit
    that generates customized screen setting information
    based on the request received by the screen display unit,
    wherein
  the setting transmitting/receiving unit transmits the customized screen setting information to the device corresponding to the device identification information, and
  the device displays a setting screen according to the customized screen setting information.

11. The information processing apparatus according to
claim 10, wherein
  the setting information contains status information indicating whether the setting information is enabled,
  the information processing apparatus further comprises a
    storage unit that stores therein default setting information to be referred to when the setting information is
    customized, and
  the screen display unit compares the setting information
    contained in the screen setting information and the
    default setting information and displays the customized
    setting screen according to a result of the comparison.

12. The information processing apparatus according to
claim 11, wherein
  when a setting item or a setting value is set to enabled based
    on the setting information but is not set to enabled based
    on the default setting information according to a result of
    the comparison between the setting information and the
    default setting information, the screen display unit displays the customized setting screen by setting the setting
    item or the setting value to disabled.

13. The information processing apparatus according to
claim 12, wherein
  the setting information contains display attribute information indicating whether the setting information is to be
    displayed by the displaying on the device, and
  the screen display unit sets unique luminance to the display
    attribute information of the setting item or the setting
    value so that the setting item or the setting value is set to
    disabled.

14. The information processing apparatus according to
claim 10, wherein
  the screen display unit changes a screen size of the customized setting screen to a size that can be displayed by the
    screen display unit and displays the customized setting
    screen in a changed size.

15. The information processing apparatus according to
claim 12, further comprising:
  an input receiving unit that receives an input of size change
    information for changing a screen size of the customized
    setting screen, wherein
  when the input of the size change information is received,
    the screen display unit changes a screen size of the
    customized setting screen based on the size change
    information and displays the customized setting screen
    in a changed size.

16. The screen display method according to claim 15,
wherein
  the setting information contains positional information
    indicating a position of the setting information on the
    setting screen,
  the input receiving unit receives an instruction for moving
    setting information contained in the customized setting
    screen displayed by the screen display unit,
  the information processing apparatus further comprises a
    position calculating unit that calculates a position of the
    setting information on the customized setting screen in
    response to the instruction, and
  the customized screen setting information generating unit
    sets the position calculated by the position calculating
    unit to the positional information and generates the customized screen setting information based on the positional information.

17. The information processing apparatus according to
claim 15, wherein
  the screen setting information contains display setting
    information indicating whether the setting information
    is to be displayed, and
  the screen display unit displays a display setting screen
    separated from the customized setting screen, based on
    the display setting information contained in the customized screen setting information, and when setting information is moved to the display setting screen because of
    the instruction received by the input receiving unit, the
    screen display unit hides the setting information.

18. The information processing apparatus according to
claim 10, wherein the screen setting information and the
setting information are written in an extensible markup language format.

19. A screen display system comprising:
a device; and
an information processing apparatus connected to the device via a communication network, wherein
the device comprises:
- a first screen display unit that displays a setting screen containing setting information for controlling functions of the device;
- a setting acquiring unit that acquires screen setting information containing the setting information and information on a configuration of the setting screen, and updates the screen setting information with customized screen setting information on customization of the screen setting information; and
- a first setting transmitting/receiving unit that transmits the screen setting information and device identification information for identifying the device to the information processing apparatus, and the information processing apparatus comprises:
- a second setting transmitting/receiving unit that receives the screen setting information and the device identification information from the device;
- a second screen display unit that displays a customized setting screen for receiving a request for customization of the screen setting information on the basis of the setting information contained in the screen setting information received from the device, the customized setting screen including a selection function to select a display position of the setting information displayed on the device or to select a display format, including luminance level of the setting information displayed on the device; and
- a customized screen setting information generating unit that generates the customized screen setting information based on the request received by the second screen display unit, wherein the second setting transmitting/receiving unit of the information processing apparatus transmits the customized screen setting information to the device corresponding to the device identification information, the first setting transmitting/receiving unit of the device receives the customized screen setting information from the information processing apparatus, the setting acquiring unit of the device updates the screen setting information with the customized screen setting information received from the information processing apparatus; and the first display unit of the device displays a setting screen according to the screen setting information updated with the customized screen setting information received from the information processing apparatus.

* * * * *